US012658500B2

(12) United States Patent (10) Patent No.: US 12,658,500 B2

Yoon (45) Date of Patent: Jun. 16, 2026

(54) COOLING FINS FOR BATTERY COOLING AND BATTERY COOLING SYSTEM INCLUDING SAME

(71) Applicant: HYUNDAI MOBIS CO., LTD., Seoul (KR)

(72) Inventor: Young Chan Yoon, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 524 days.

(21) Appl. No.: 18/203,268

(22) Filed: May 30, 2023

(65) Prior Publication Data

US 2024/0079673 A1 Mar. 7, 2024

(30) Foreign Application Priority Data

Sep. 6, 2022 (KR) ........................ 10-2022-0112498

(51) Int. Cl.
H01M 10/6551 (2014.01)
H01M 10/625 (2014.01)
(52) U.S. Cl.
CPC ..... H01M 10/6551 (2015.04); H01M 10/625 (2015.04)
(58) Field of Classification Search
CPC ........... H01M 10/6551; H01M 10/625; H01M 10/643
USPC ....................................................... 429/120
See application file for complete search history.

(56) References Cited

U.S. PATENT DOCUMENTS

| | | | | |
|---|---|---|---|---|
| 2015/0079444 A1* | 3/2015 | Baumgartner | ........ | H01M 50/24 |
| | | | | 429/120 |
| 2016/0359210 A1* | 12/2016 | Hasegawa | ......... | H01M 10/6551 |
| 2017/0301964 A1* | 10/2017 | Murakami | .......... | H01M 10/643 |
| 2019/0363410 A1* | 11/2019 | Siegler | ................ | H01M 10/623 |
| 2023/0207927 A1 | 6/2023 | Sugiyama | | |

FOREIGN PATENT DOCUMENTS

| | | |
|---|---|---|
| EP | 3 188 303 A1 | 7/2017 |
| KR | 10-2013-0112105 A | 10/2013 |

OTHER PUBLICATIONS

Extended European Search Report issued on Feb. 16, 2024 in European Patent Application No. 23195012.2.

* cited by examiner

*Primary Examiner* — James M Erwin

(74) *Attorney, Agent, or Firm* — Morgan, Lewis & Bockius LLP

(57) ABSTRACT

The present disclosure relates to a battery cooling fin, and more particularly, to a battery cooling fin for cooling cylindrical battery cells. The present disclosure provides a battery cooling fin and a battery cooling system including the same, the battery cooling fin being a cooling fin that is an extruded material to be inserted between cylindrical battery cells while having excellent thermal conductivity, to provide a replaceable battery applied to a small electric vehicle or a two-wheeled vehicle.

12 Claims, 9 Drawing Sheets

22

22

1

COOLING FINS FOR BATTERY COOLING AND BATTERY COOLING SYSTEM INCLUDING SAME

CROSS-REFERENCE OF RELATED APPLICATIONS

This application claims priority under 35 U.S.C. § 119 to Korean Patent Application No. 10-2022-0112498, filed on Sep. 6, 2022, in the Korean Intellectual Property Office, the disclosure of which is incorporated herein by reference in its entirety.

TECHNICAL FIELD

The following disclosure relates to a battery cooling fin, and more particularly, to a battery cooling fin for cooling cylindrical battery cells.

BACKGROUND

As the spread of electric vehicles accelerates, the number of vehicles that use a battery as an energy source is increasing. However, there have been inconveniences in using electric vehicles because electric charging stations for charging electric vehicles are not sufficient as compared to the increasing supply of electric vehicles, and it takes a long time to charge an electric vehicle.

As one of the solutions to this problem, research on replaceable batteries is being conducted. At this point, it is necessary to cool the battery in order to maintain and improve its performance, and thus, it is necessary to optimize a cooling method so that the battery is replaceable.

More specifically, a battery mounted in an electric vehicle generates a large amount of heat in the process of charging or discharging the battery. In particular, in a large-capacity secondary battery, more heat is accompanied according to an increase in the amount of current while the battery is charged or discharged. If the heat generated at that time is not sufficiently removed, this may cause a deterioration in performance of the battery, and furthermore, may lead to ignition or explosion. Therefore, it is required to cool the battery in order to maintain and improve the performance of the battery, and most of the existing vehicle battery systems according to the conventional art adopt a water-cooling or air-cooling method. However, the water-cooling or air-cooling method is not suitable for a replaceable battery because it has a problem that, at the time of replacing the battery, it is necessary to replace a cooling fluid line together with the battery.

PRIOR ART DOCUMENT

Patent Document

Korean Laid-Open Patent Publication No. 10-2013-0112105 entitled "BATTERY COOLING DEVICE"

SUMMARY

An embodiment of the present disclosure is directed to providing a battery cooling fin and a battery cooling system including the same, the battery cooling fin being a cooling fin that is an extruded material to be inserted between cylindrical battery cells while having excellent thermal conductivity, so as to provide a replaceable battery applied to a small electric vehicle or a two-wheeled vehicle.

In one general aspect, a battery cooling fin contacting side surfaces of cylindrical battery cells to increase thermal conductivity includes: a body portion extending in a first direction in which the cylindrical battery cells are arranged; two side portions formed on both sides of the body portion; and support portions contacting an inner wall surface of a battery housing and formed at both ends of the side portions, wherein at least one of the two side portions includes contact grooves formed in a shape corresponding to the side surfaces of the cylindrical battery cells.

The battery cooling fin may further include a coupling part disposed between the side surfaces of the cylindrical battery cells and the side portion.

The coupling part may include a thermally conductive interface material.

The contact grooves may be formed to be spaced apart from each other at a predetermined distance along the first direction in which the side portions extend.

The contact grooves may be formed on both of the side portions.

The contact grooves may be formed on one of the side portions, and the other side portion, on which the contact grooves are not formed, may be formed to be flat.

Hollows may be formed in the center of the body portion.

The side portion may be a plate having a uniform thickness with the contact grooves formed thereon, and the side portion may have a thickness of 2 mm or more.

The side portion may have a height that is 75% or more and less than 100% of a height of each of the cylindrical battery cells.

The side portion may include two or more stack pieces stacked in a height direction, and each of the stack pieces may have a protrusion or a groove formed at an upper or lower end thereof.

In another general aspect, a battery cooling system includes: two end cooling fins disposed at both ends of a battery cell array including cylindrical battery cells, each of the two end cooling fins including support portions formed at both ends of two side portions thereof while contacting an inner wall surface of a battery housing with contact grooves formed on only one of the two side portions; and plates contacting the support portions formed at both ends of the end cooling fin.

The battery cooling system may further include at least one central cooling fin disposed inside the battery cell array with contact grooves formed on both of the two side portions.

Each of the end cooling fin and the central cooling fin may include a fastening portion formed between the contact grooves, and the fastening portion formed on each of both sides of the central cooling fin is coupled to the fastening portion of another central cooling fin or the end cooling fin.

In the battery cooling fin and the battery cooling system according to the present disclosure having the above-described configuration, the battery cooling fin is a cooling fin that is an extruded material to be inserted between cylindrical battery cells while having excellent thermal conductivity so as to provide a replaceable battery applied to a small electric vehicle or a two-wheeled vehicle.

Figure 1:
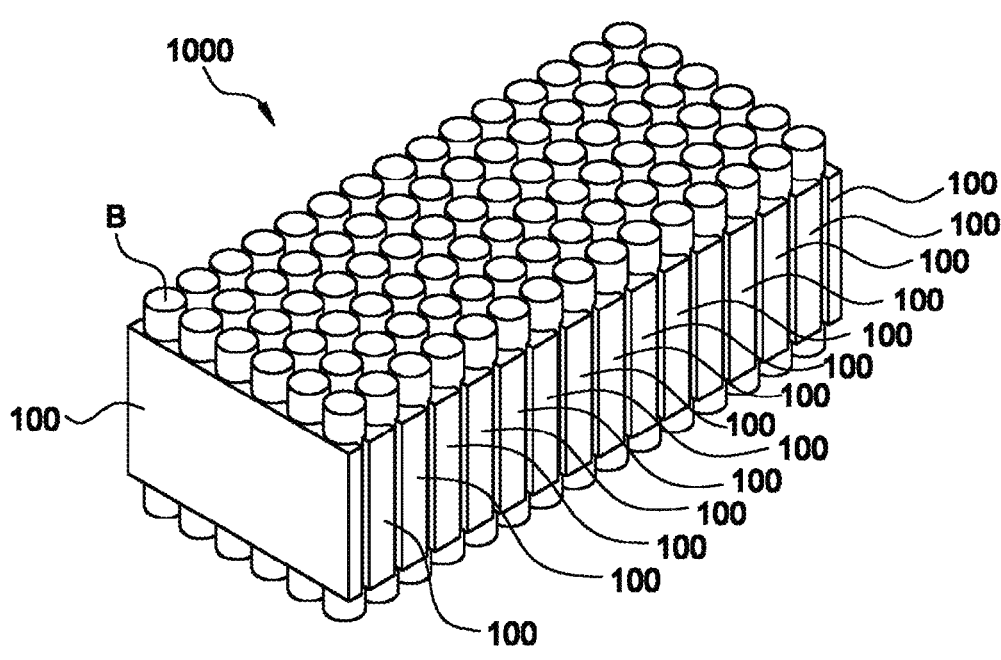
FIG. 1 is a perspective view of a battery module to which a battery cooling fin according to the present disclosure is applied.

DETAILED DESCRIPTION OF MAIN
ELEMENTS

1000: Battery cooling system
100: Battery cooling fin
10: Body portion
11: Hollow
20: Side portion
21: Contact groove
22: Stack piece
30: Support portion
40: Coupling part
110: End cooling fin
120: Central cooling fin
130: Fastening portion
200: Plate
B: Cylindrical battery cell

DETAILED DESCRIPTION OF EMBODIMENTS

Hereinafter, the technical idea of the present disclosure will be described in more detail with reference to the accompanying drawings. Further, terms or words used in the specification and claims below should not be interpreted as being limited to the ordinary or dictionary meanings, but interpreted as meanings and concepts corresponding to the technical idea of the present disclosure based on the principle that the inventor can appropriately define concepts of terms to describe his/her invention in the best way.

Hereinafter, a basic configuration of a battery cooling fin 100 according to the present disclosure will be described with reference to FIGS. 1 to 5.

As illustrated in FIG. 1, the present disclosure may include a battery cooling fin 100 contacting side surfaces of cylindrical battery cells B to increase thermal conductivity. The battery cooling fin 100 may be an extruded material having high thermal conductivity. The cylindrical battery cells (B) may be arranged to be spaced apart from each other at a predetermined distance to form rows and columns, and the battery cooling fin 100 may be inserted between the cylindrical battery cells B to increase a contact area with each cylindrical battery cell B, and may uniformly contact all the cells to minimize a temperature difference between the cells. In addition, by filling a space between the cylindrical battery cells B, the battery cooling fin 100 is capable of stably supporting the positions of the cylindrical battery cells.

Figure 2:
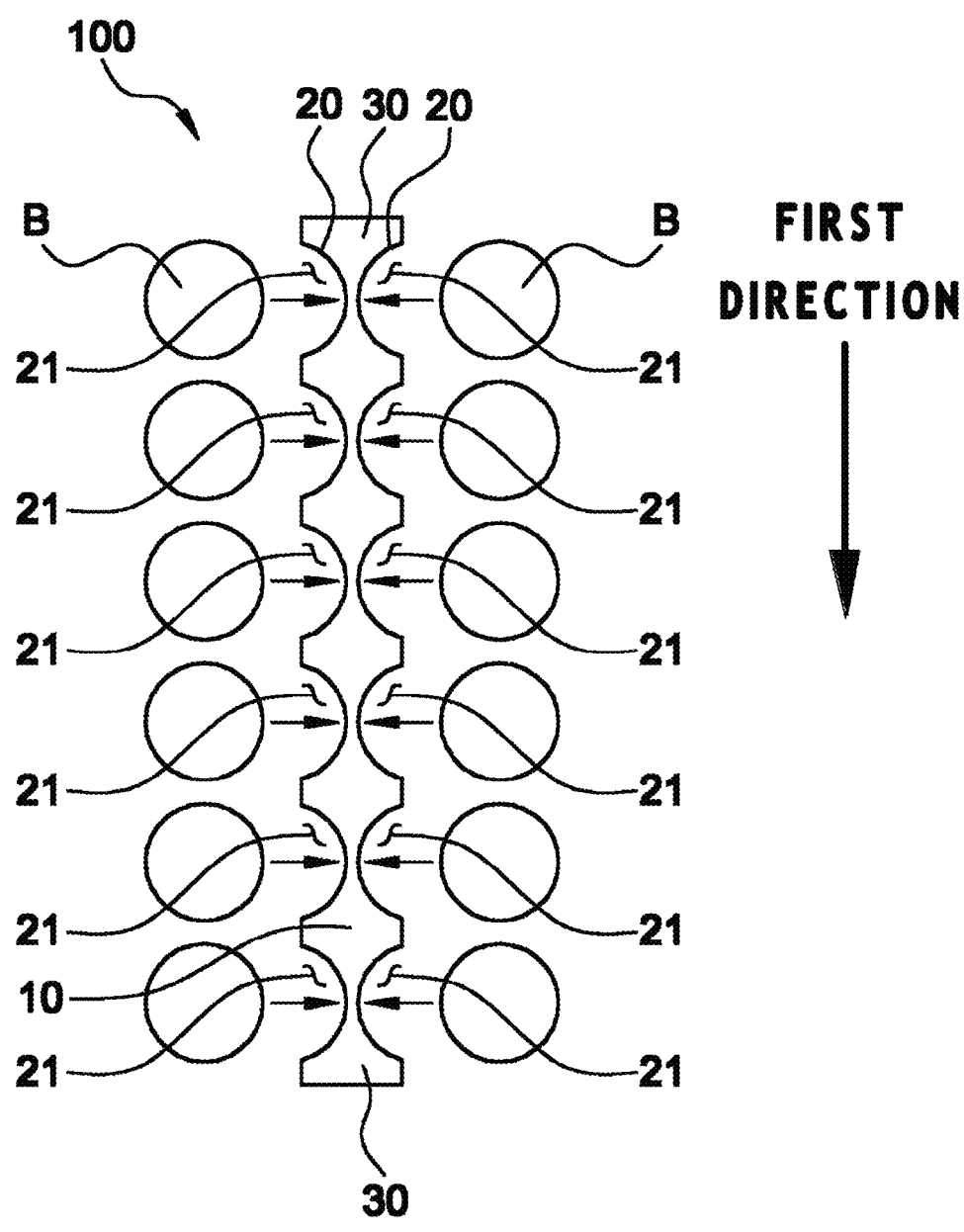
FIG. 2 is a top view of the battery cooling fin according to the present disclosure.

More specifically, as illustrated in FIG. 2, the battery cooling fin 100 according to the present disclosure may include: a body portion 10 extending in one direction in which the cylindrical battery cells B are arranged, two side portions 20 formed on both sides of the body portion 10, and support portions 30 contacting an inner wall surface of a battery housing and formed at both ends of the side portions 20. The body portion 10, the side portions 20, and the support portions 30 may be integrally formed with each other, and may be extruded at once when manufactured. When the battery housing is made of a plastic material rather than a metal such as aluminum, the support portions 30 are preferably made of a metal material. To this end, the battery cooling fin 100 may be manufactured through an insert injection method. Accordingly, a thermal path between the cylindrical battery cells B, the battery cooling fin 100, and the battery housing can be established, thereby maximizing cooling efficiency.

At this time, at least one of the two side portions 20 preferably includes contact grooves 21 formed in a shape corresponding to the side surfaces of the cylindrical battery cells B. If the battery to which the battery cooling fin 100 is applied includes battery cells having a shape other than the cylindrical shape, rather than cylindrical battery cells, the contact grooves 21 may be modified accordingly when implemented. In addition, the contact grooves 21 may be formed to be spaced apart from each other at a predetermined distance along the first direction in which the side portions 20 extend. It is preferable that the distance between the contact grooves 21 is equal to or slightly smaller than the distance at which the cylindrical battery cells B are spaced apart from each other.

Figure 3:
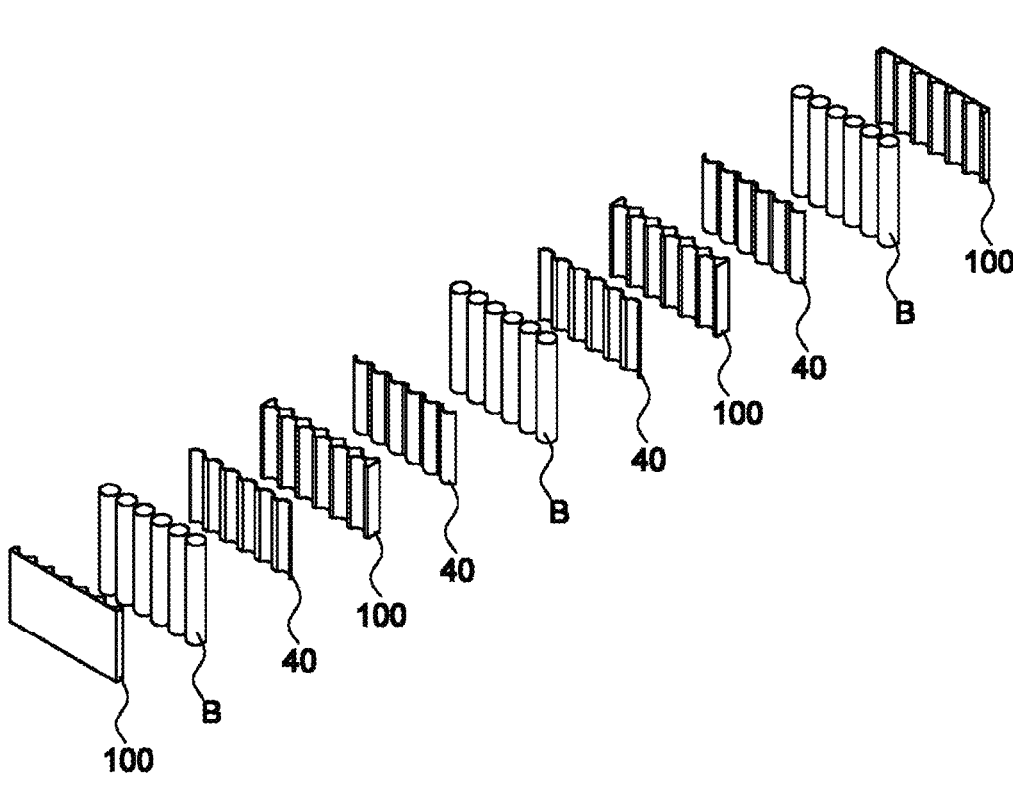
FIG. 3 is an exploded perspective view of the battery module to which the battery cooling fin according to the present disclosure is applied.

In addition, as illustrated in FIG. 3, it is preferable that the battery cooling fin 100 further includes a coupling part 40 disposed between the side surfaces of the cylindrical battery cells B and the side portion 20. The coupling part 40 preferably includes a thermally conductive interface material or an adhesive. By adopting a material having high thermal conductivity for the coupling part 40 as well, it is possible to minimize thermal conductivity between the cylindrical battery cells B and the battery cooling fin 100 from being hindered by the adhesive.

The battery cooling fin 100 according to the present disclosure may be applied to a battery module, such that the battery module is cooled more effectively than a battery module to which the conventional art. More specifically, it can be confirmed that, since battery cells are cooled in a state where a cooling plate is in contact with only lower surfaces of the battery cells, the upper surfaces of the battery cells, which are not in contact with the cooling plate, are not cooled and heat is concentrated thereon. In addition, it can be confirmed that the battery cooling fin 100 according to the present disclosure, which contacts the side surfaces of the cylindrical battery cells B, has superior cooling performance as compared to the conventional art in which the battery cells are cooled through the lower sides of the battery cells. Therefore, the battery cooling fin 100 according to the present disclosure is applied to a replaceable battery module of a small electric vehicle, a two-wheeled vehicle, or the like, of which output conditions are not harsh, resulting in advantageous effects in that cooling performance can be secured without ancillary devices required for cooling, and cost can be reduced.

Hereinafter, types of battery cooling fins 100 according to the present disclosure will be described with reference to FIG. 4.

As illustrated in FIG. 2 and as described above, the contact grooves 21 may be formed in both side portions 20, and accordingly the cylindrical battery cells B may be inserted on both sides. The battery cooling fin 100 having such a shape may be disposed at the center of the battery module. Hereinafter, the battery cooling fin 100 disposed at the center of the battery module will be referred to as a central cooling fin 120.

Figure 4:
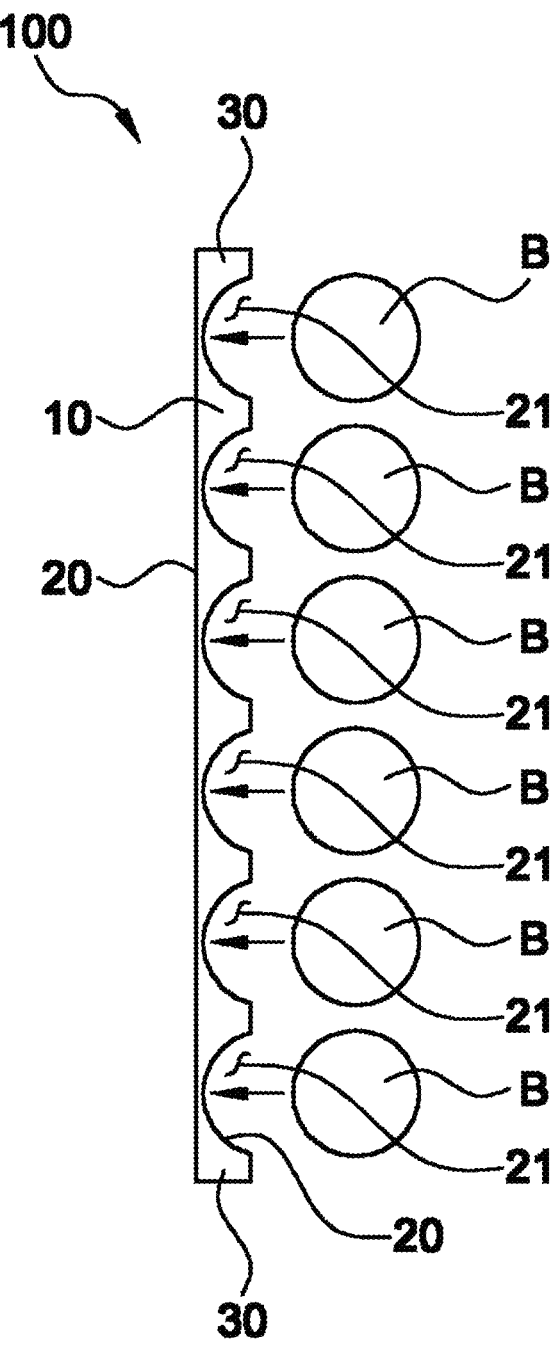
FIG. 4 is a top view of an end cooling fin, which is a type of battery cooling fin according to the present disclosure.

In addition, as illustrated in FIG. 4, the contact grooves 21 may be formed on one side or the other side of side portions 20. At this time, the other side surface, on which the contact grooves 21 are not formed, is preferably formed to be flat. Accordingly, the battery module may be inserted only on one side of the battery cooling fin 100. The battery cooling fin 100 having such a shape may be disposed at each of both ends of the battery module. Hereinafter, the battery cooling fin 100 disposed at each of both ends of the battery module will be referred to as an end cooling fin 110. In the end cooling fin 110, the flat surface on which the contact grooves 21 are not formed may be made of a metal material. This may be implemented by an insert injection method. The surface made of a metal material with no contact grooves 21 formed thereon as described above is in contact with an inner surface of the battery housing to establish a thermal path between the cylindrical battery cells B and the battery housing.

Hereinafter, a battery cooling fin 100 according to a first embodiment of the present disclosure will be described with reference to FIG. 5

Figure 5:
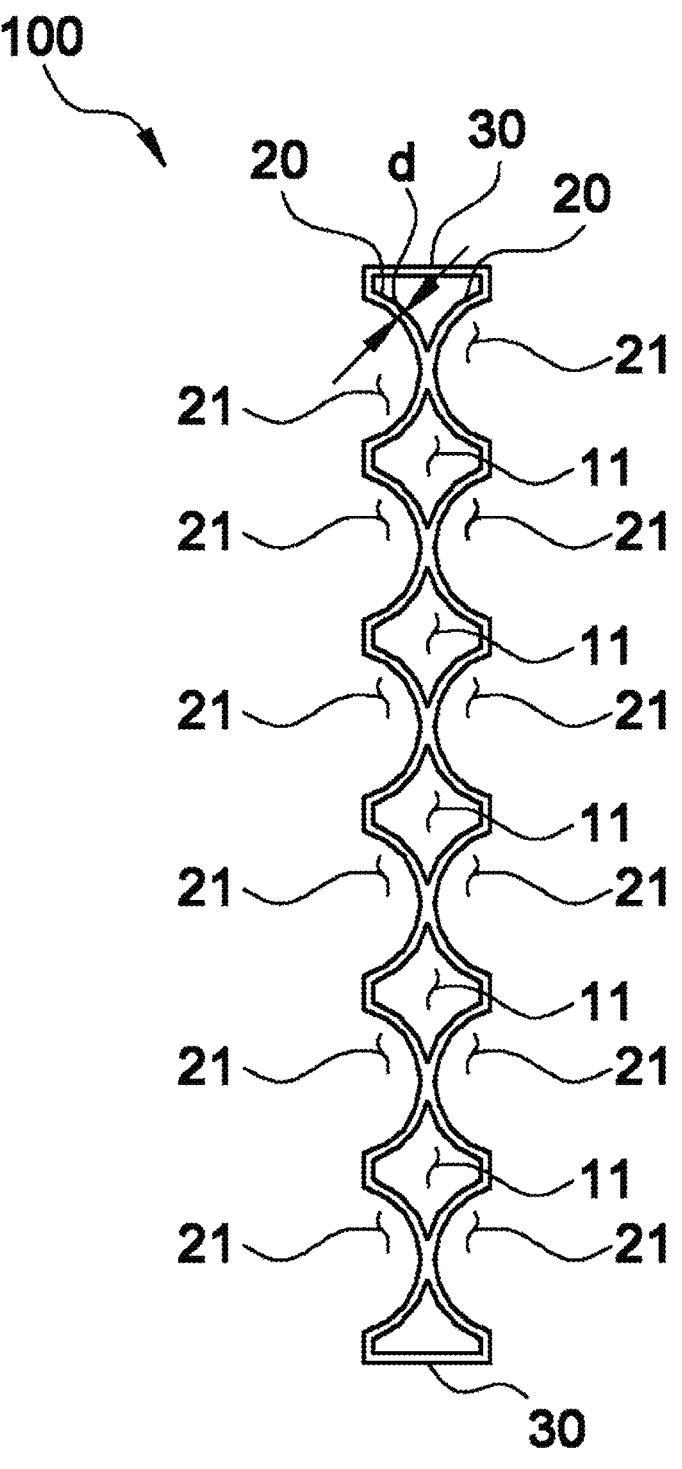
FIG. 5 is a top view of a battery cooling fin according to a first embodiment of the present disclosure.

As illustrated in FIG. 5, in the battery cooling fin 100 according to the first embodiment of the present disclosure, hollows 11 may be formed in the center of the body portion 10. The body portion 10 may be formed by being surrounded by the side portions 20 formed to have a certain thickness. As an example, the side portion 20 may be a plate having a uniform thickness in a bent shape formed by the contact grooves 21, and the thickness d of the side portion 20 may be 2 mm or more. By adopting such a shape, the weight of the battery cooling fin 100 can be reduced and cost can be reduced.

In the battery cooling fin 100 according to the present disclosure, the thinner the side portion 20, the lower the thermal conductivity, increasing a temperature difference between central cells and peripheral cells (the heat conduction path has a length that increases toward the center of the side portion 20). where the thickness of the side portion 20 is 1 mm, which is less than 2 mm, it can be seen that heat is concentrated on cylindrical battery cells B located in the central portion, resulting in a great temperature difference.

In addition, when the battery cooling fin 100 having no hollows 11, it can be seen that heat is smoothly dissipated from the cylindrical battery cells B, but it has not been confirmed that the effect is significant when compared to that in the first embodiment of the present disclosure in which the thickness of the side portion 20 is 2 mm and the hollows 11 are formed in the center of the body portion 10. Therefore, an embodiment in which the thickness of the side portion 20 is 2 mm can be said to be the most preferable because cost and weight can be reduced while maintaining cooling performance. When the material of the battery cooling fin 100 according to the present disclosure, the type of the battery, or the arrangement therebetween changes, the above-described limit on the thickness of the side portion 20 may be modified accordingly.

Hereinafter, a battery cooling fin 100 according to a second embodiment of the present disclosure will be described with reference to FIGS. 6 to 7.

Figure 6:
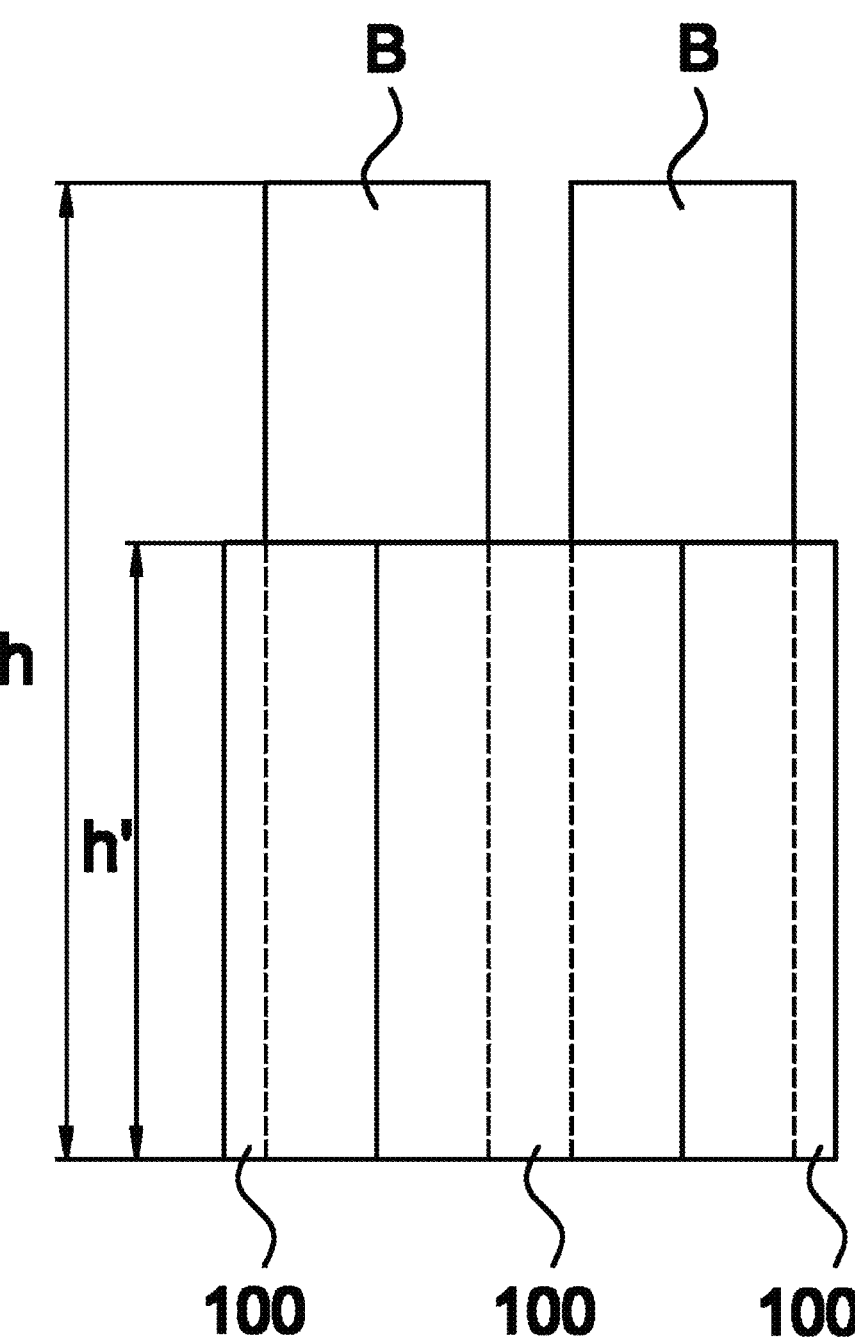
FIG. 6 is a top view of a battery cooling fin according to a second embodiment of the present disclosure.
Figure 7:
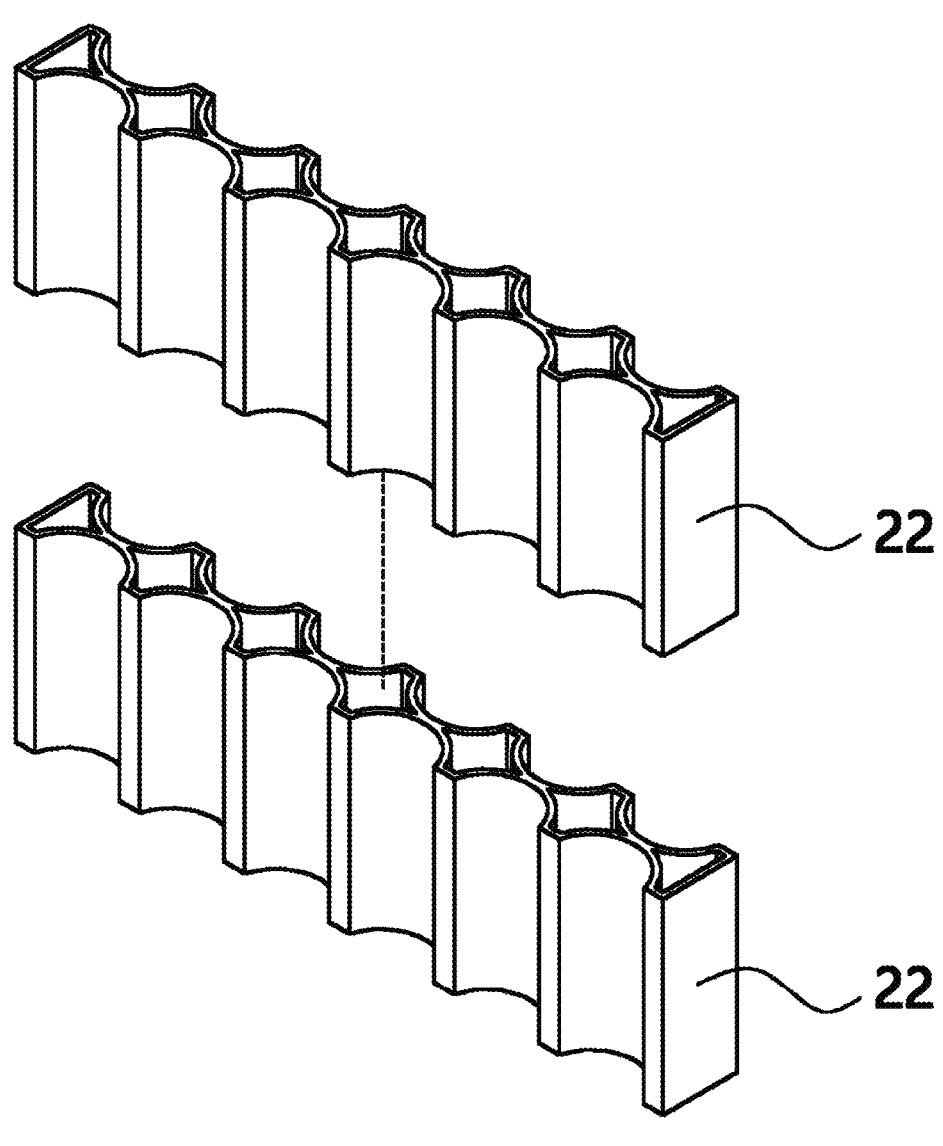
FIG. 7 is a conceptual diagram illustrating stack pieces according to the present disclosure.

As illustrated in FIG. 6, the side portion 20 has a height h' that is preferably 75% or more and less than 100% of a height h of the cylindrical battery cell B. In this case, in an embodiment, as shown in FIG. 7, the side portion 20 may include two or more stack pieces 22 stacked in a height direction. One of the stack pieces 22 may have a protrusion at an upper or lower end thereof, and the other one of the stack pieces 22 may have a groove at an upper or lower end thereof, such that the protrusion and the groove are fitted to each other. Each stack piece 22 may have a predetermined unit height, and the battery cooling fin 100 may be formed by assembling the stack pieces 22 together so that the height h' of the entire side portion 20 is 75% or more and less than 100% of the height h of the cylindrical battery cell B.

When h' is 50% of h, it can be seen that heat is concentrated on battery cells located in the central portion of the battery, not dissipated therefrom. That is, a sufficient contact area is not secured. When h' is 85% of h, it can be seen that heat is uniformly dissipated from all the battery cells by securing a sufficient contact area. In addition, when h' is 75% of h, it can be seen that uniform heat dissipation is performed overall, although there is a slight temperature difference. Accordingly, it can be said that the height h' of the side portion 20 according to the present disclosure is most preferably 75% or more and less than 100% of h. When the material of the battery cooling fin 100 according to the present disclosure, the type of the battery, or the arrangement therebetween changes, the above-described limit on the height of the side portion 20 may be modified accordingly.

Hereinafter, a basic configuration of a battery cooling system 1000 according to the present disclosure will be described with reference to FIG. 8.

Figure 8:
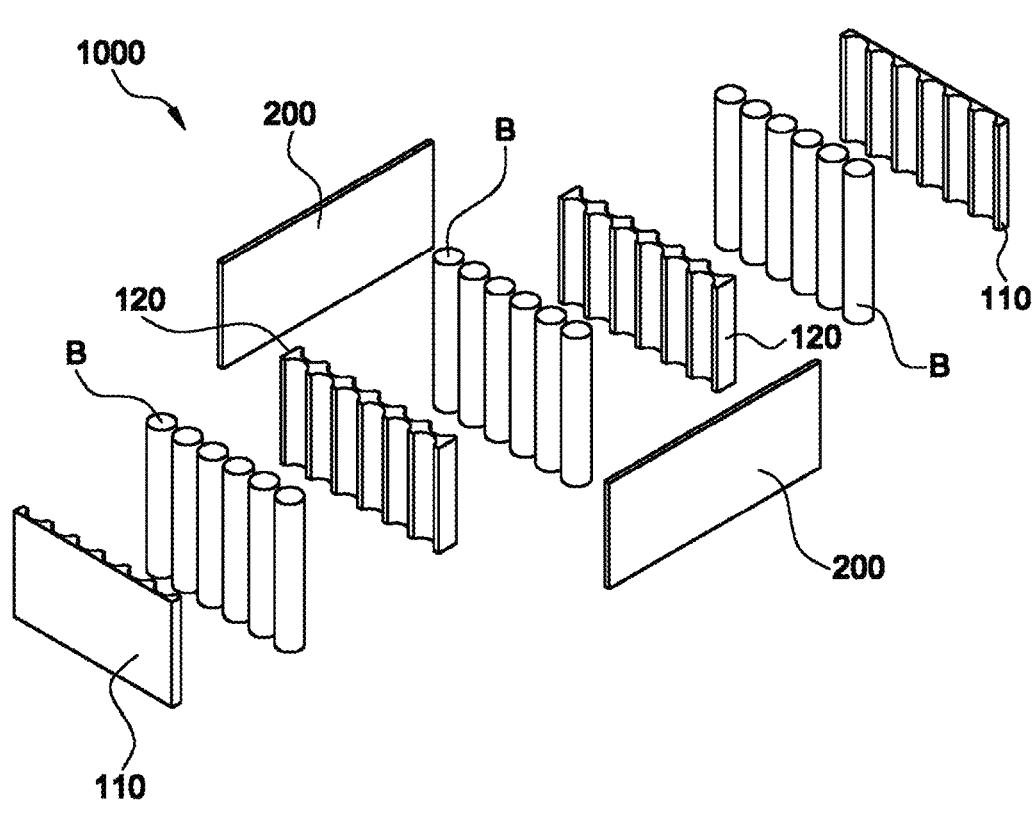
FIG. 8 is a perspective view of a battery module to which a battery cooling system according to the present disclosure is applied.

As illustrated in FIG. 8, the battery cooling system 1000 according to the present disclosure may include: two end cooling fins 110 disposed at both ends of a battery cell array including cylindrical battery cells B, each of the two end cooling fins 110 including support portions 30 formed at both ends of two side portions 20 thereof with contact grooves 21 formed on only one of the two side portions and contacting an inner wall surface of a battery housing; and plates 200 contacting the support portions 30 formed at both ends of the end cooling fin 110. As described above, in the end cooling fin 110, the flat surface on which the contact grooves 21 are not formed may be made of a metal material, and the surface made of a metal material with no contact grooves 21 formed thereon is in contact with the inner surface of the battery housing to establish a thermal path between the cylindrical battery cells B and the battery housing.

Also, the plates 200 may be made of a metal material, and may be integral with the battery housing or may be an accessory member separated from the battery housing. By providing the metal plate 200 between the battery housing and the support portion 30, thermal conductivity can be increased and heat dissipation efficiency can be increased.

In addition, it is preferable that the battery cooling system 1000 further includes at least one central cooling fin 120 disposed inside the battery cell array with contact grooves 21 formed on both of two side portions 20 thereof. As described above, the cylindrical battery cells B may be inserted on both sides of the central cooling fin 120.

That is, since the battery cooling system 1000 according to the present disclosure includes end cooling fins 110 and central cooling fins 120, the cooling fins can be disposed both between the cylindrical battery cells B and on the peripheries of the battery modules. As a result, heat can be uniformly dissipated from all the cylindrical battery cells, and the respective positions of the cylindrical battery cells can be supported.

Hereinafter, a battery cooling system 1000 according to an embodiment of the present disclosure will be described with reference to FIG. 9.

Figure 9:
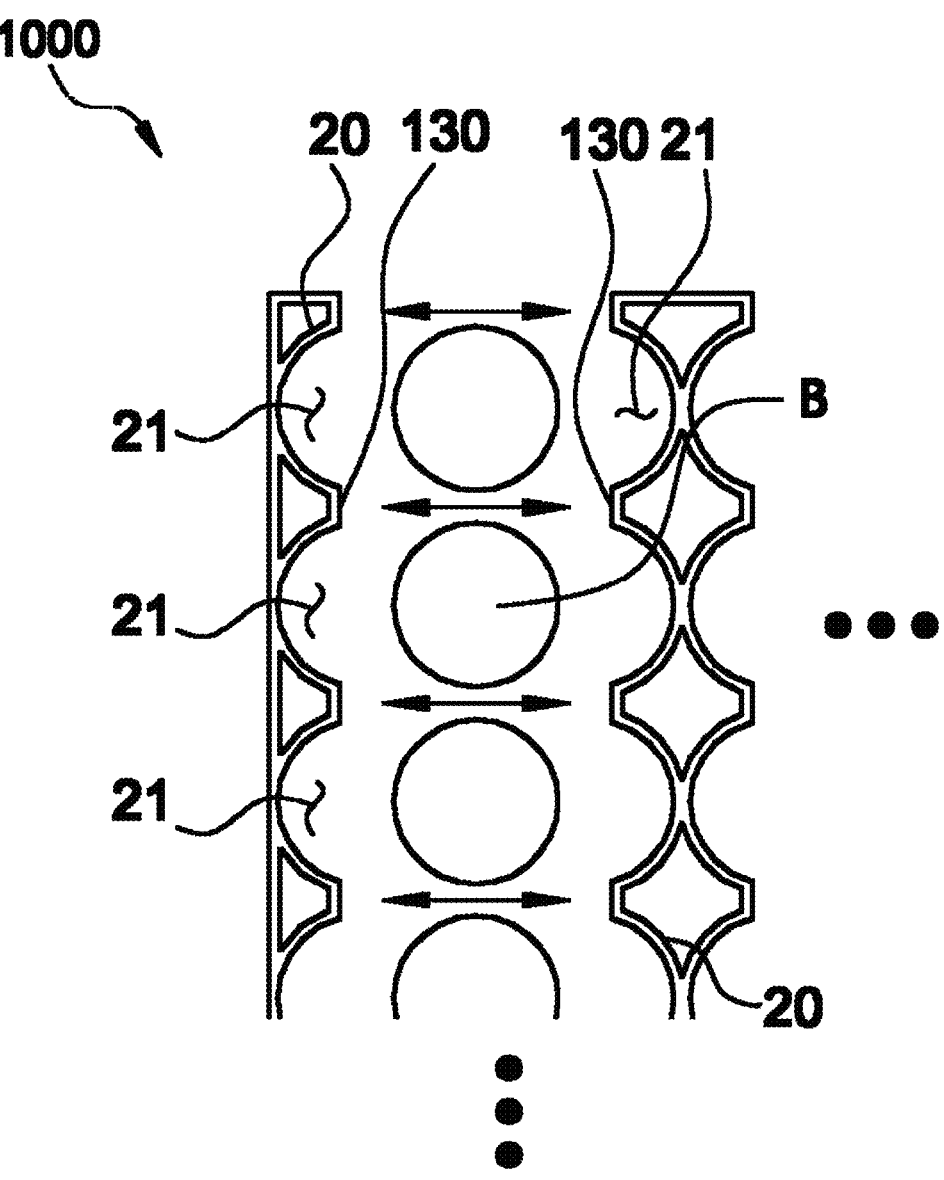
FIG. 9 is a conceptual diagram illustrating a fastening portion according to the present disclosure.

As illustrated in FIG. 9, each of the end cooling fin 110 and the central cooling fin 120 may include a fastening portion 130 formed between the contact grooves 21. The fastening portion 130 may be a protrusion or a groove, and each of the fastening portions 130 formed on both sides of the central cooling fin 120 is preferably coupled to the fastening portion 130 of another central cooling fin 120 or the end cooling fin 110.

In the central cooling fin 120, it is preferable that the fastening portion 130 on one side includes a protrusion and the fastening portion 130 on the other side includes a groove. It is also preferable that the fastening portion 130 in one of the end cooling fins 110 includes a protrusion, and the fastening portion 130 in the other one of the end cooling fins 110 includes a groove. Accordingly, the fastening portions 130 of the battery cooling fins 100 adjacent to each other may be fitted to each other, and the positions of the battery cooling fins 100 may be dependent on each other.

The technical idea should not be interpreted as being limited to the above-described embodiments of the present disclosure. The present disclosure is applicable in a variety of ranges, and may be modified in various manners by those skilled in the art without departing from the gist of the present disclosure claimed. Therefore, such improvements and modifications fall within the protection scope of the present disclosure as long as they are obvious to those skilled in the art.

What is claimed is:

1. A battery cooling fin contacting side surfaces of cylindrical battery cells to increase thermal conductivity, the battery cooling fin comprising:
  a body portion extending in a first direction in which the cylindrical battery cells are arranged;
  two side portions formed on both sides of the body portion; and
  support portions contacting an inner wall surface of a battery housing and formed at both ends of the side portions,
  wherein at least one of the two side portions includes contact grooves formed in a shape corresponding to the side surfaces of the cylindrical battery cells, and
  wherein the battery cooling fin further includes a fastening portion formed between the contact grooves for coupling with a fastening portion of an adjacent battery cooling fin.

2. The battery cooling fin of claim 1, further comprising a coupling part disposed between the side surfaces of the cylindrical battery cells and one of the side portions.

3. The battery cooling fin of claim 2, wherein the coupling part includes a thermally conductive interface material.

4. The battery cooling fin of claim 1, wherein the contact grooves are formed to be spaced apart from each other at a predetermined distance along the first direction in which the side portions extend.

5. The battery cooling fin of claim 4, wherein the contact grooves are formed on both of the side portions.

6. The battery cooling fin of claim 4, wherein the contact grooves are formed on one of the side portions, and
  the other of the side portions, on which the contact grooves are not formed, is formed to be flat.

7. The battery cooling fin of claim 1, wherein hollows are formed in the center of the body portion.

8. The battery cooling fin of claim 1, wherein one of the side portions is a plate, on which the contact grooves are formed, having a uniform thickness of 2 mm or more.

9. The battery cooling fin of claim 1, wherein one of the side portions has a height that is 75% or more and less than 100% of a height of each of the cylindrical battery cells.

10. The battery cooling fin of claim 1, wherein the battery cooling fin includes two or more stack pieces stacked and coupled to one another in a height direction, each of the stack pieces including the body portion, the side portions, and the support portions.

11. A battery cooling system comprising:
  two end cooling fins disposed at both ends of a battery cell array including cylindrical battery cells, each of the two end cooling fins including two side portions and support portions formed at both ends of the two side portions, the support portions contacting an inner wall surface of a battery housing, wherein contact grooves are formed on only one of the two side portions;
  plates contacting the support portions formed at both ends of each of the two end cooling fins; and
  at least one central cooling fin disposed inside the battery cell array with contact grooves formed on both of two side portions of the at least one central cooling fin,
  wherein each of the two end cooling fins and the at least one central cooling fin includes a fastening portion formed between the contact grooves.

12. The battery cooling system of claim 1, wherein the fastening portion formed on each of both sides of the at least one central cooling fin is coupled to the fastening portion of another central cooling fin or one of the end cooling fins.

* * * * *